(12) United States Patent
Hutchinson et al.

(10) Patent No.: US 7,099,118 B2
(45) Date of Patent: Aug. 29, 2006

(54) ONE-PIECE SUSPENSION ASSEMBLY INCLUDING INTERCONNECT

(75) Inventors: Andrew J. Hutchinson, New Prague, MN (US); Bradley J. Ver Meer, Savage, MN (US); Zine-Eddine Boutaghou, North Oaks, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 245 days.

(21) Appl. No.: 10/725,220

(22) Filed: Dec. 1, 2003

(65) Prior Publication Data

US 2004/0240115 A1   Dec. 2, 2004

Related U.S. Application Data

(60) Provisional application No. 60/475,053, filed on Jun. 2, 2003.

(51) Int. Cl.
*G11B 5/60* (2006.01)

(52) U.S. Cl. .............................. 360/245.9; 360/245.5; 360/264.2

(58) Field of Classification Search ............ 360/245.9, 360/245.8, 244.3, 245.5
See application file for complete search history.

(56) References Cited

U.S. PATENT DOCUMENTS

| | | | | |
|---|---|---|---|---|
| 4,670,804 A * | 6/1987 | Kant et al. | ................ | 360/254.2 |
| 4,996,623 A * | 2/1991 | Erpelding et al. | ........ | 360/244.3 |
| 5,282,103 A | 1/1994 | Hatch et al. | ................. | 360/245 |
| 5,644,448 A * | 7/1997 | Suzuki | ..................... | 360/97.01 |
| 5,734,524 A * | 3/1998 | Ruiz | .......................... | 360/234 |
| 5,781,379 A | 7/1998 | Erpelding et al. | ........ | 360/245.3 |
| 5,781,381 A | 7/1998 | Koganezawa et al. | ... | 360/294.3 |
| 5,796,169 A * | 8/1998 | Dockerty et al. | ........... | 257/780 |
| 5,796,558 A | 8/1998 | Hanrahan et al. | ......... | 360/294.6 |
| 5,812,344 A * | 9/1998 | Balakrishnan | ............ | 360/245.9 |
| 5,864,446 A * | 1/1999 | Endo et al. | ............... | 360/244.6 |
| 5,883,759 A | 3/1999 | Schulz | ..................... | 360/245.9 |
| 5,896,246 A | 4/1999 | Budde et al. | ............. | 360/244.4 |
| 5,923,500 A | 7/1999 | Hagen | ...................... | 360/245.3 |
| 5,955,176 A * | 9/1999 | Erpelding et al. | .......... | 428/209 |
| 5,995,328 A | 11/1999 | Balakrishnan | ............ | 360/245.9 |
| 6,024,584 A * | 2/2000 | Lemke et al. | .................. | 439/83 |
| 6,031,693 A | 2/2000 | Takahashi et al. | ........ | 369/13.17 |
| 6,064,550 A | 5/2000 | Koganezawa | ............. | 360/294.3 |
| 6,134,075 A | 10/2000 | Bennin et al. | ........... | 360/245.9 |
| 6,313,972 B1 | 11/2001 | Williams et al. | ......... | 360/245.3 |
| 6,449,127 B1 | 9/2002 | Crane | ...................... | 360/244.2 |
| 6,522,624 B1 | 2/2003 | Budde | ..................... | 360/294.3 |
| 6,658,722 B1 * | 12/2003 | Kurita et al. | ............. | 29/603.03 |

(Continued)

OTHER PUBLICATIONS

U.S. Appl. No. 10/389,864, Boutaghou.

*Primary Examiner*—Jefferson Evans
(74) *Attorney, Agent, or Firm*—Kinney & Lange, P.A.

(57) ABSTRACT

An integrated suspension assembly including interconnect is used to provide an electrical and mechanical connection between an actuation system and a slider. The suspension assembly includes a multi-layer laminate substrate having a base layer, an insulator layer and a conductor layer. The laminate substrate further includes an attachment region for attaching the suspension assembly to an actuator arm, a load beam region, a flexure region for supporting the slider, and an interconnect path. The interconnect path extends along the flexure region, the load beam region and the attachment region wherein the path terminates at the attachment region at a connection point to provide an electro-mechanical attachment to the actuator arm.

23 Claims, 7 Drawing Sheets

U.S. PATENT DOCUMENTS 6,785,094 B1 * 8/2004 Arya et al. ............. 360/244.3

2004/0066582 A1 * 4/2004 Boutaghou ............... 360/245.8

* cited by examiner

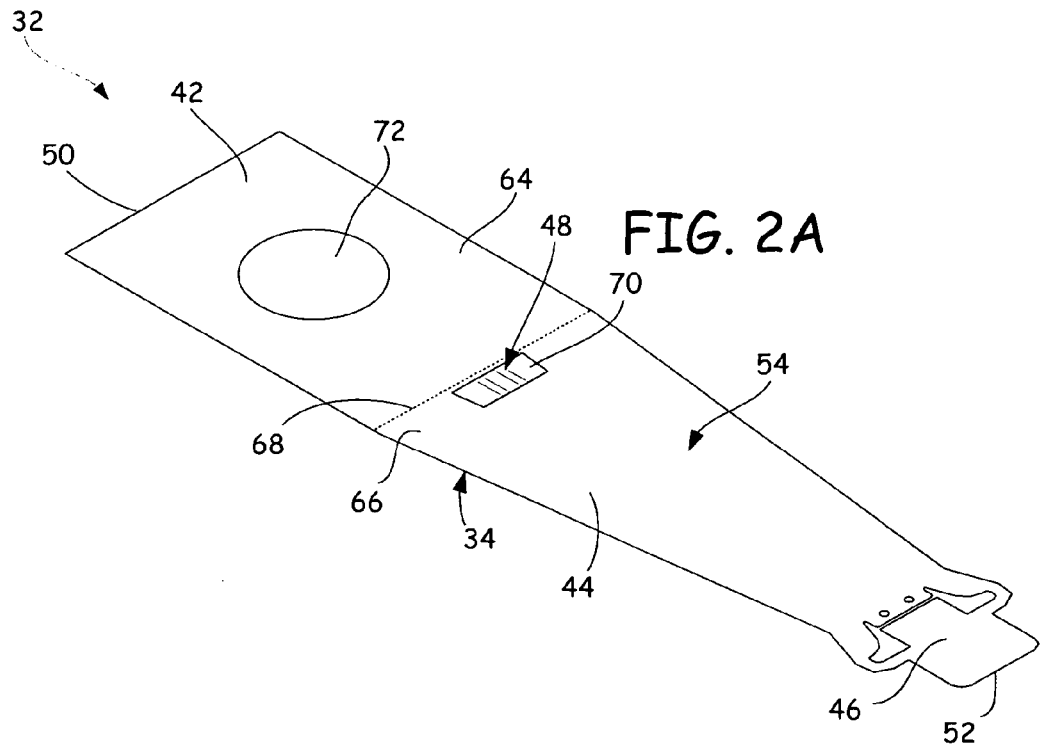
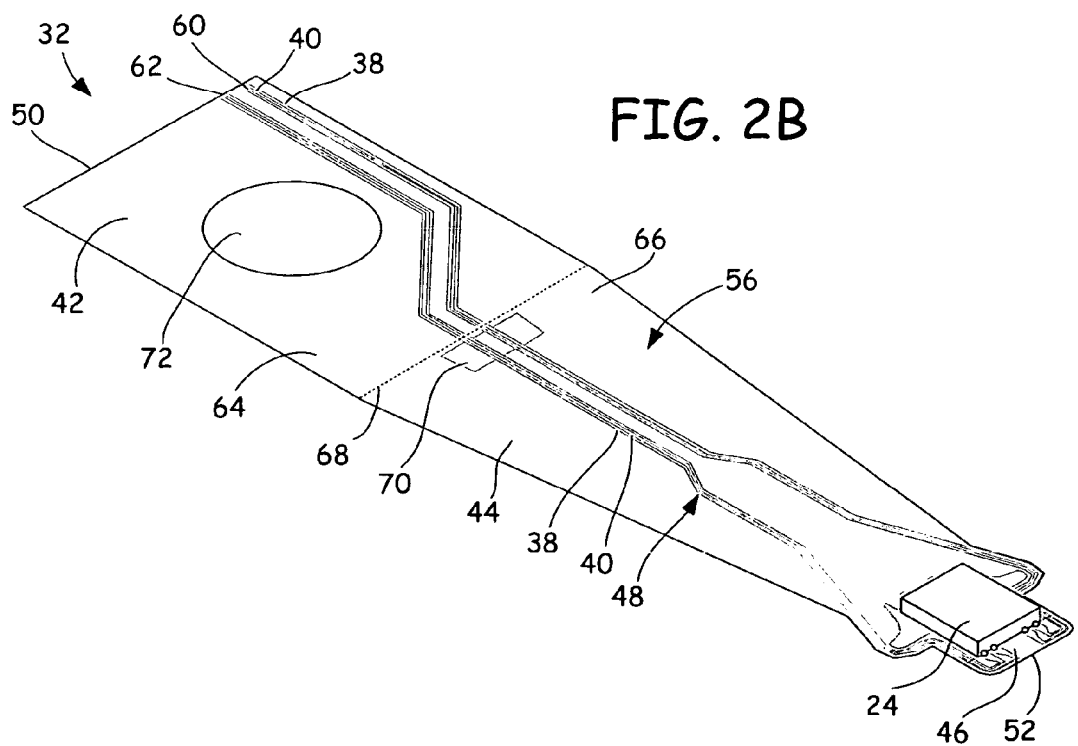

ONE-PIECE SUSPENSION ASSEMBLY INCLUDING INTERCONNECT

CROSS-REFERENCE TO RELATED APPLICATION(S)

This application claims priority from provisional application No. 60/475,053 filed Jun. 2, 2003, for "One-Piece Low Cost Flexure Interconnect and Attachment" by Andrew J. Hutchinson, Bradley J. Ver Meer and Zine-Eddine Boutaghou.

BACKGROUND OF THE INVENTION

The present invention relates to a low cost suspension assembly. In particular, the present invention relates to a one-piece integrated suspension assembly to provide mechanical and electrical connection between an actuator arm and a slider supporting a read/write head for a disc drive actuation assembly.

Generally, a magnetic disc drive includes a magnetic disc and a magnetic read/write head. When the disc rotates, the read/write head reads and writes magnetic signals on circular tracks of the disc. The read/write head is typically mounted on a slider, which is supported by a flexure or head gimbal assembly. The flexure is mounted to a suspension or load beam, which biases the slider toward the surface of the rotating disc. This biasing is sometimes referred to as "pre-loading". The load beam is attached to an actuator arm of an actuator at an attachment plate, or base plate. The actuator arm moves the read/write head over the spinning disc during operation.

A typical prior art suspension assembly is comprised of four components, an attachment plate, a load beam, a flexure and an interconnect, including a flex circuit material and metal trace. One end of the load beam is attached to the actuator arm at the attachment place, oftentimes by swaging. A flexure is attached to an opposite end of the load beam, oftentimes with an adhesive and/or welding, and the slider is mounted to a bottom surface of the flexure. The interconnect is attached to bottom surfaces of the flexure, the load beam and the attachment plate to form an electrical connection path from the slider to the actuator arm. First, a flex circuit material is deposited upon the bottom surface of the suspension assembly, either the entire surface or a portion defining the interconnect path. Second, a metal trace is deposited upon the flex circuit material to provide the electrical connection between the slider and the actuator arm. The flex circuit material insulates the metal trace from the suspension assembly. Alternatively, a pre-fabricated interconnect is attached to the bottom surfaces of the suspension assembly.

Other prior art suspension assemblies include integrated components to improve performance by decreasing the number of suspension components, however, none include a low cost, one-piece, or single component, suspension assembly. For example, some suspension assemblies include an integrated load beam and flexure, an integrated flexure and interconnect, an integrated load beam, flexure and interconnect, or an integrated attachment plate, load beam and flexure. These suspension assemblies require extra assembly processes to complete the suspension assembly prior to attaching the assembly to the actuator arm or mounting the slider. Examples of extra assembly processes include, attaching the attachment plate to the load beam for connection to the actuator arm, attaching the load beam to the flexure and/or attaching the interconnect to the suspension assembly.

As the disc drive industry advances technologically, each element of the disc drive assembly is becoming increasingly integrated, and space and assembly costs are at a premium. It is desirable to integrate the components of the suspension assembly into a single piece to provide mechanical and electrical connections between the slider and the actuator arm and a simpler, less expensive suspension assembly.

BRIEF SUMMARY OF THE INVENTION

The present invention relates to a low-cost, integrated suspension assembly, including interconnect, to provide an electrical and mechanical connection between an actuation system and a slider. The suspension assembly includes a multi-layer laminate substrate having a base layer, an insulator layer and a conductor layer. The laminate substrate further includes an attachment region for attaching the suspension assembly to an actuator arm, a load beam region, a flexure region for supporting the slider, and an interconnect path. The interconnect path extends along the flexure region, the load beam region and the attachment region wherein the path terminates at the attachment region at a connection point to provide an electromechanical attachment to the actuator arm.

BRIEF DESCRIPTION OF THE DRAWINGS

FIG. 2A is a top perspective view of one embodiment of an integrated suspension assembly of the present invention.

FIG. 2B is a bottom perspective view of the suspension assembly shown in FIG. 2A.

DETAILED DESCRIPTION

Figure 1:
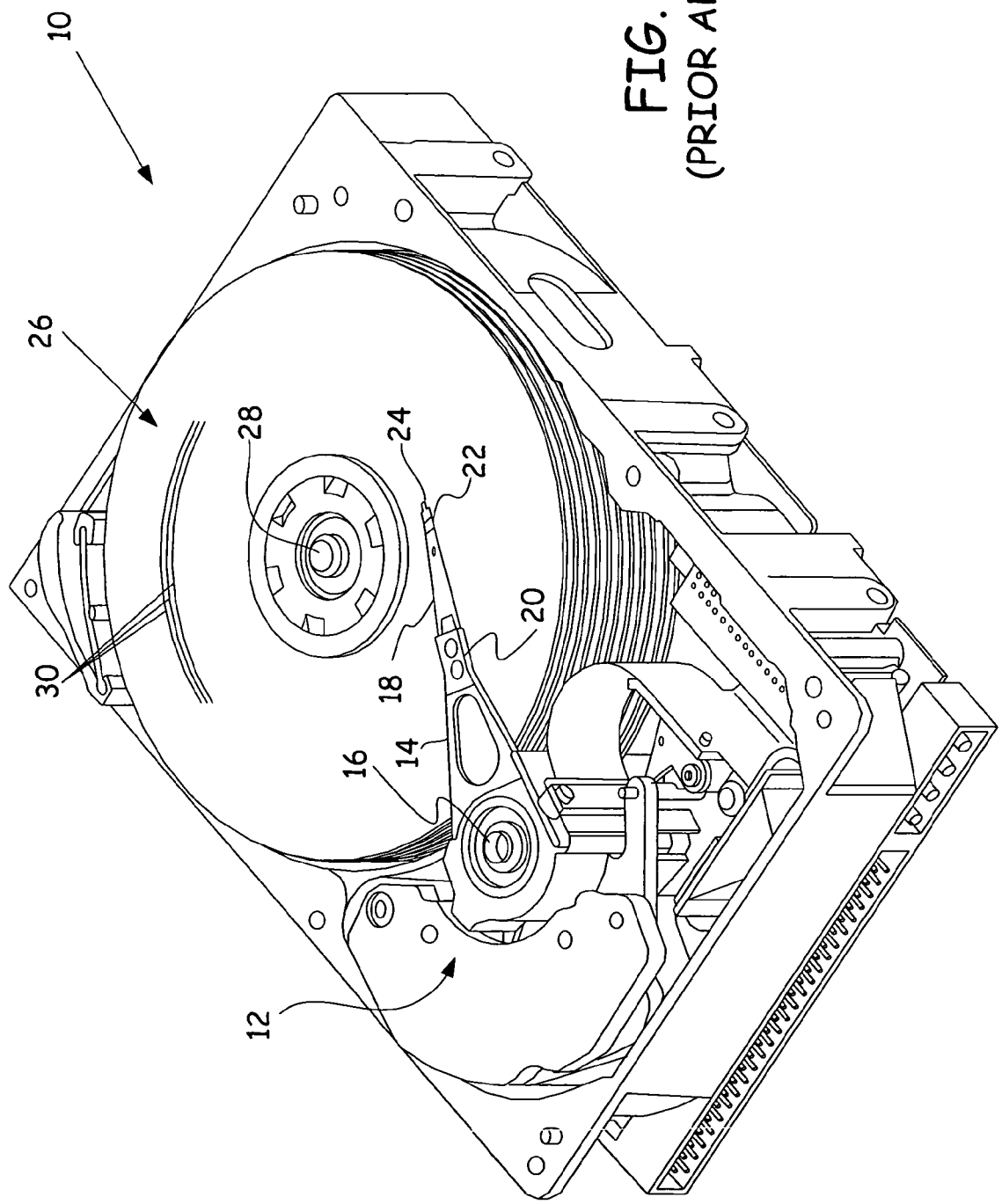
FIG. 1 is a perspective view of a prior art disc drive actuation system for positioning a slider over tracks of a disc.

FIG. 1 is a perspective view of a prior art disc drive actuation system 10. Actuation system 10 includes a voice coil motor (VCM) 12 arranged to rotate an actuator arm 14 on a spindle around an axis 16. A load beam 18 is connected to actuator arm 14 at an attachment plate 20, or base plate. A flexure 22 is connected to an end of load beam 18, and carries a slider 24. Slider 24 carries a transducing head (not shown) for reading and/or writing data on a disc 26, which rotates around an axis 28 and includes concentric tracks 30 on which the data is written. VCM 12 is selectively operated to move actuator arm 14 around axis 16, thereby moving slider 24 between tracks 30 of disc 26. As disc 26 rotates, windage is encountered by slider 24 to keep it aloft a small distance above the surface of disc 26.

The present invention is a low cost suspension assembly. In particular, the present invention relates to a one-piece integrated suspension assembly that provides mechanical and electrical connections between actuator arm 18 and slider 24 supporting a read/write head (not shown) for disc drive actuation system 10. The suspension assembly can be incorporated into any actuation system that requires a flexible interconnect between the actuation system and another, for example, a disc drive actuation system or a microscope. The suspension assembly incorporates attachment plate 20, load beam 18 and flexure 22 into a single component, and also includes an integrated interconnect path, to provide a simple, low cost suspension assembly.

FIG. 2A is a top perspective view of an integrated, one-piece suspension assembly 32 of the present invention, and FIG. 2B is a bottom perspective view of suspension assembly 32. Suspension assembly 32 is formed from a multi-layer laminate substrate 34, shown in FIG. 3.

Figure 3:
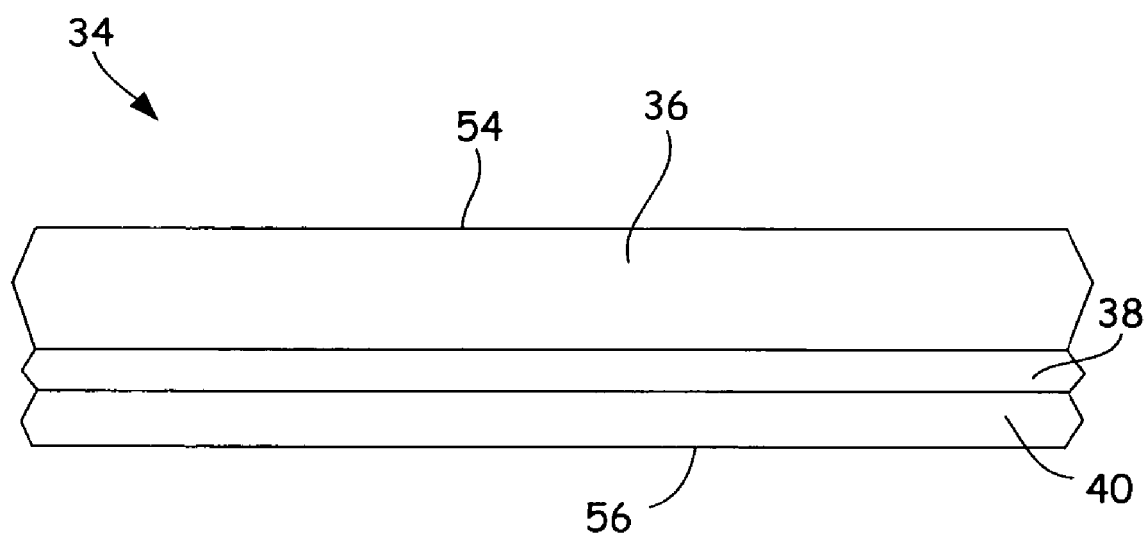
FIG. 3 is a cross-sectional view of a multi-layer laminate substrate.

FIG. 3 is a cross-sectional view of multi-layer laminate substrate 34. Laminate substrate 34 includes a support layer 36, or base layer, an insulator layer 38 and a conductor layer 40. Support layer 36 is composed of a non-corrosive material, such as stainless steel. Insulator layer 38 is composed of a dielectric material, such as polyimide, and conductor layer 40 is composed of an electrically conductive material, such as copper, aluminum or the like. One example of laminate substrate 34 is TSA™ manufactured by Rogers Corp. (of Rogers, Conn.). In further embodiments of suspension assembly 32, fewer or more layers may be used to form laminate structure 34.

As shown in FIGS. 2A and 2B, suspension assembly 32 includes an attachment region 42, a load beam region 44, a flexure region 46, and an interconnect path 48, which as an integrated assembly formed by single component suspension assembly 32 fabricated from substrate 34. Suspension assembly 32 has a first end 50 and a second end 52. Attachment region 42 is located at first end 50 of suspension assembly 32 and attaches suspension assembly 32 to actuator arm 14. Flexure region 46 is located at second end 52 of suspension assembly 32 and supports slider 24. Load beam region 44 is a flexible region positioned between attachment region 42 and flexure region 46.

Suspension assembly 32 includes a top surface 54 formed by support layer 36 of laminate substrate 34 and an opposite bottom surface 56 formed by a combination of support layer 36, insulator layer 38, and conductor layer 40. Interconnect path 48 extends along bottom surface 56 of suspension assembly 32 from flexure region 46, across load beam region 44, to attachment region 42. Interconnect path 48 is defined by insulator layer 38 and conductor layer 40 of laminate substrate 34, wherein insulator layer 38 defines the flex circuit material of interconnect path 48 and conductor layer 40 forms a metal trace of interconnect path 48. Insulator layer 38 insulates the metal conductor layer 40 from support layer 36.

Slider 24 is supported upon bottom surface 56 of flexure region 46 of suspension assembly 32. A first end 58 of interconnect path 48 is interconnected with slider 24 to provide an electrical connection from slider 24 to actuator arm 14 (not shown). A second end 60 of interconnect path 48 terminates at a connection point 62, defined by conductor layer 40, at attachment region 42. Bottom surface 56 of attachment region 42 of the suspension assembly 32 is attached to actuator arm 14. Connection point 62 provides an electrical and mechanical attachment to actuator arm 14. To connect suspension assembly 32 to actuator arm 14, a solder and/or conductive adhesive connection is made between connection point 62 and the actuator arm. In addition, a non-conductive adhesive may also be used to further bond attachment region 42 of suspension assembly 32 to actuator arm 14.

Attachment region 42 has a forward portion 64 which is adjacent a rearward portion 66 of load beam region 44. In attaching suspension assembly 32 to actuator arm 14, forward portion 64 of attachment region 42 is attached to actuator arm 14 with either solder or a solder/adhesive combination. Attaching forward portion 64 of attachment region 42 insures a good attachment to actuator arm 14 and constrains attachment region 42 to further provide mechanical stiffness and performance to suspension assembly 32. That is, constraining attachment region 42 at an attachment line 68 further defines the stiff and flexible portion of suspension assembly 32.

Load beam region 44 of suspension assembly 32 includes a void 70 positioned at rearward portion 66. Removing a portion of support layer 36 proximate attachment line 68 and at rearward portion 66 of load beam region 44, adjusts vertical stiffness of suspension assembly 32 to provide more or less vertical stiffness and adjusts the performance of suspension assembly 32. Removing support layer 36 directly under where interconnect path 48 crosses from load beam region 44 to attachment region 42, increases flexibility of load beam region 44 and flexure region 46 is provided.

As seen in FIGS. 2A and 2B, attachment region 42 of suspension assembly 32 includes a void 72. Void 72 facilitates the positioning and location of suspension assembly 32 with respect to the actuator arm. For example, a pin is driven through void 72 to locate the actuator arm with respect to suspension assembly 32 and to make them coincident. Once the suspension assembly 32 and the actuator arm are aligned, the attachment is made with either solder or a solder/adhesive combination to attach the two pieces. In further embodiments of the present invention, void 72 maybe adapted to provide a connection between suspension assembly 32 and the actuator arm.

Two examples of fabricating the one-piece suspension assembly 32 are an etching process and a deposition process. In the first example, multi-layer laminate substrate 34 is etched to form suspension assembly 32. Selected portions of support layer 36, insulator layer 38, and conductor layer 40 are etched away to form suspension assembly 32. In another example, insulator layer 38 and conductor layer 40 are deposited upon selected portions of support layer 36 to define interconnect path 48 and connection point 62, and thereby form the one-piece suspension assembly 32. In further embodiments of suspension assembly 32, other additive or subtractive process maybe used to fabricate substrate 34 and suspension assembly 32.

Figure 4A:
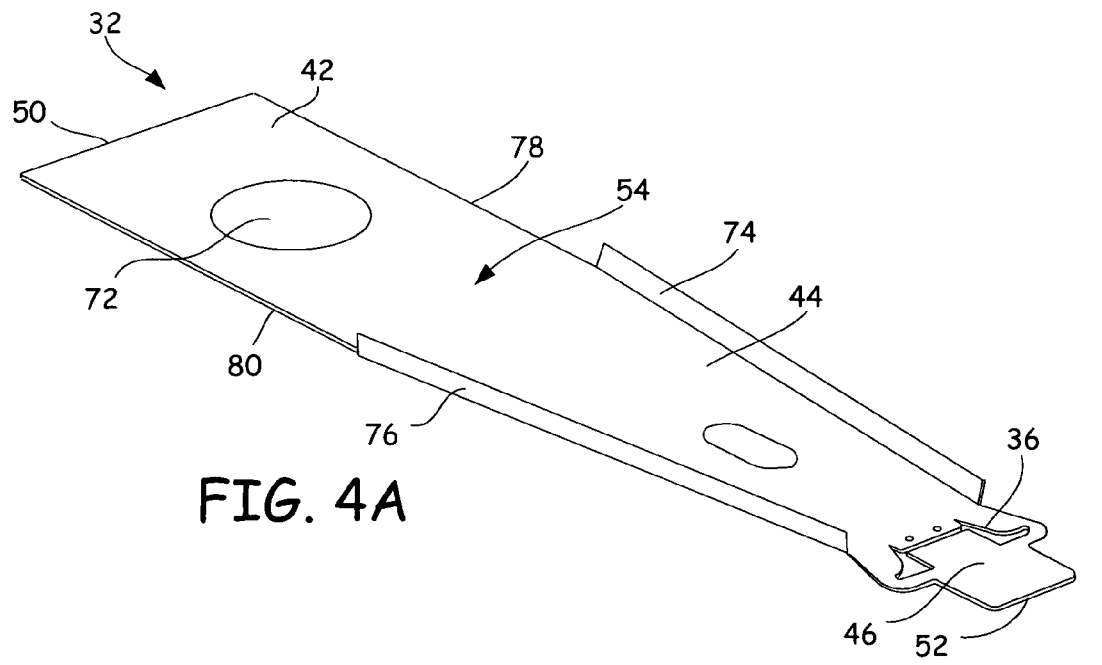
FIG. 4A is a top perspective view of another embodiment of an integrated suspension assembly of the present invention.
Figure 4B:
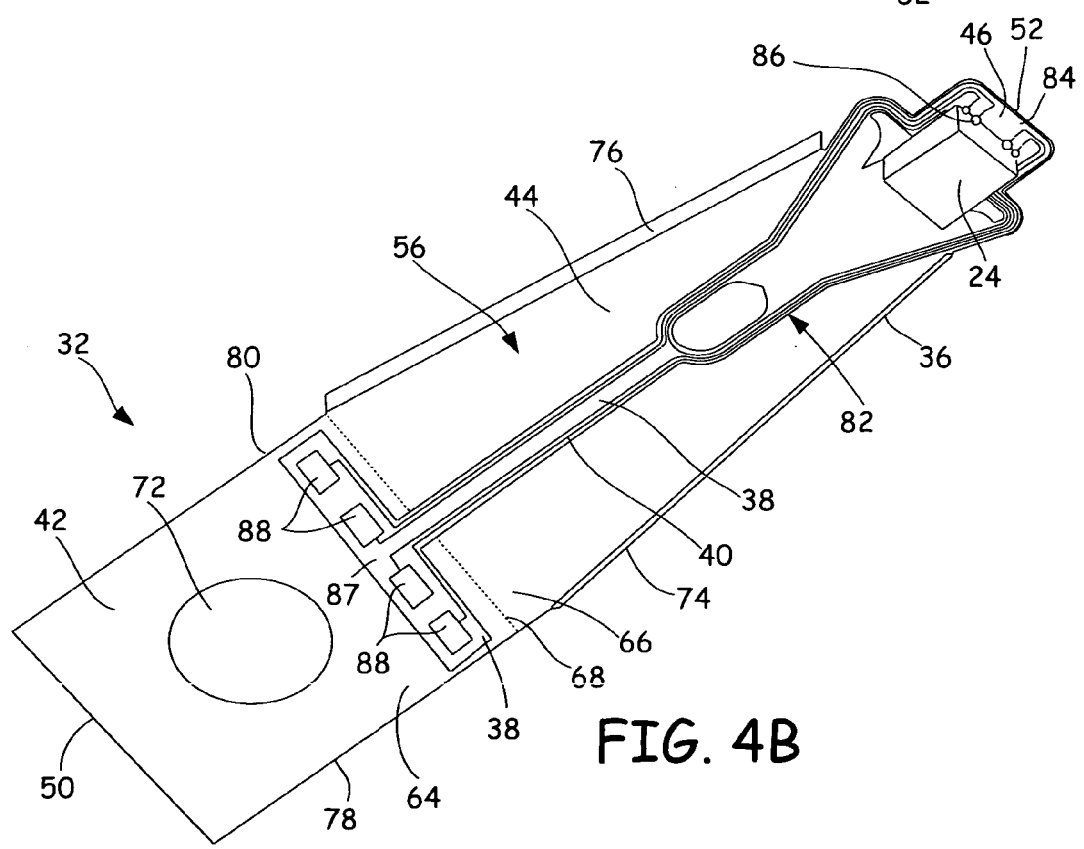
FIG. 4B is a bottom perspective view of the suspension assembly shown in FIG. 4A.

FIGS. 4A and 4B are top and bottom perspective views, respectively, of an alternate embodiment of integrated suspension assembly 32. Suspension assembly 32 includes a first rail 74 and a second rail 76 for improved tracking performance. No additional assembly processes are required, beyond forming rails 74 and 76, to prepare suspension assembly 32 for attachment to actuator arm 14 (not shown). First and second rails 74, 76 are defined by support layer 36. Suspension assembly 32 includes first and second edges 78 and 80, which extend between first end 50 and second end 52. Adjacent load beam region 44 of suspension assembly 32, first edge 78 is folded upward from the top surface to form first rail 74 and second edge 80 is folded upward from top surface 54 to form second rail 76. Thus, first and second rails 74 and 76 extend substantially perpendicular from top surface 54 of suspension assembly 32.

In further embodiments of the present invention, first and second rails 74, 76 are positioned along attachment region 42 and/or flexure region 46, instead of or in addition to rails positioned along load beam region 44. In addition, fewer or more rails may be formed by support layer 36 or a rail may be formed by support layer 36 anywhere on suspension assembly 32, not just along edges 78, 80.

Rails 74 and 76 formed along suspension assembly 32 increase the stiffness, or structural rigidity, of the suspension assembly to thereby enhance performance with respect to the embodiment shown in FIGS. 2A and 2B. Increased structural rigidity results in an increased vibrational frequency mode, which places the bending and twisting modes of the assembly at a higher frequency. A higher vibrational frequency mode results in improved tracking performance when positioning slider 24 with respect to tracks 30 of disc 26. One reason for increasing the stiffness of the flexure region 46 is to permit a load/unload application of suspension assembly 32, for example, by integrating a tab formed from support layer 36 at flexure region 46.

Suspension assembly 32 includes integrated interconnect path 82, which extends from flexure region 46, along load beam region 44, to attachment region 42. Interconnect path 82 is defined by insulator layer 38 and conductor layer 40. A first end 84 of interconnect path 82 is electrically connected to slider 24 via ball bonds 86. A second end 87 of interconnect path 48 terminates at forward portion 64 of attachment region 42, adjacent load beam region 44, to form a connection point between suspension assembly 32 and actuator arm 14 (not shown). Interconnect pads 88, defined by conductor layer 40, are formed at attachment region 42 to provide electrical and mechanical connection of suspension assembly 32 to actuator arm 14. Solder and/or conductive adhesive is used to electrically and mechanically connect interconnect pads 88 to actuator arm 14. In addition, a non-conductive adhesive at attachment region 42 may also be used to attach suspension assembly 32 to actuator arm 14.

Figure 5:
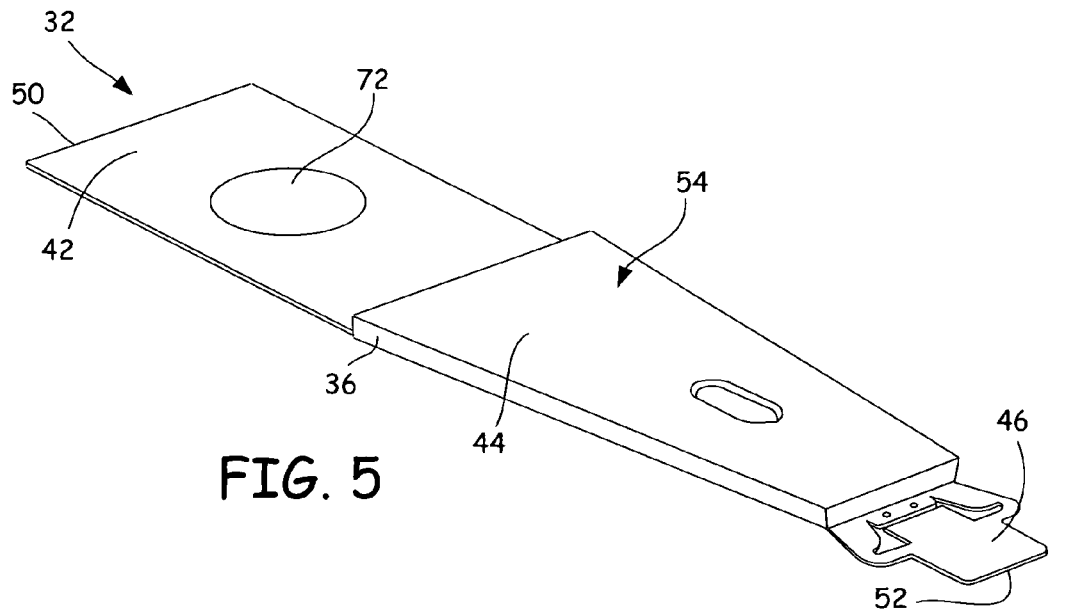
FIG. 5 is a top perspective view of another embodiment of an integrated suspension assembly of the present invention.

FIG. 5 is a top perspective view of another embodiment of integrated suspension assembly 32, including a thicker, partially etched portion to enhance performance of suspension assembly 32. Partial etching of support layer 36 during fabrication of suspension assembly 32 is used to vary a thickness of a portion of suspension assembly 32 along a length of suspension assembly 32. In the embodiment shown in FIG. 5, load beam region 44 has a thickness greater than a thickness of attachment region 42 and a thickness of flexure region 46. In further embodiments either attachment region 42, flexure region 46 or both may have an increased thickness (with respect to the embodiment shown in FIGS. 2A and 2B) instead of or in addition to load beam region 44.

In the suspension assembly shown in FIG. 5, a multi-layer laminate substrate with a support layer having a greater thickness than a standard laminate substrate (for example, laminate substrate 34 shown in FIG. 3) is used. Portions of the substrate are not etched as deeply, i.e., partially etched, as a remainder of the substrate to achieve the varying thickness of suspension assembly 32. Increasing the thickness of a portion of suspension assembly 32 increases the structural rigidity and vibrational frequency mode to thereby enhance performance of suspension assembly 32 (with respect to the embodiment shown in FIGS. 2A and 2B). Increasing the thickness of the attachment region 42 of suspension assembly 32 provides additional structure to form an attachment between suspension assembly 32 and actuator arm 14. Increasing the stiffness of the flexure region 46 of suspension assembly 32 permits a load/unload application of suspension assembly 32, for example, by integrating a tab formed from support layer 36 at flexure region 46.

Figure 6:
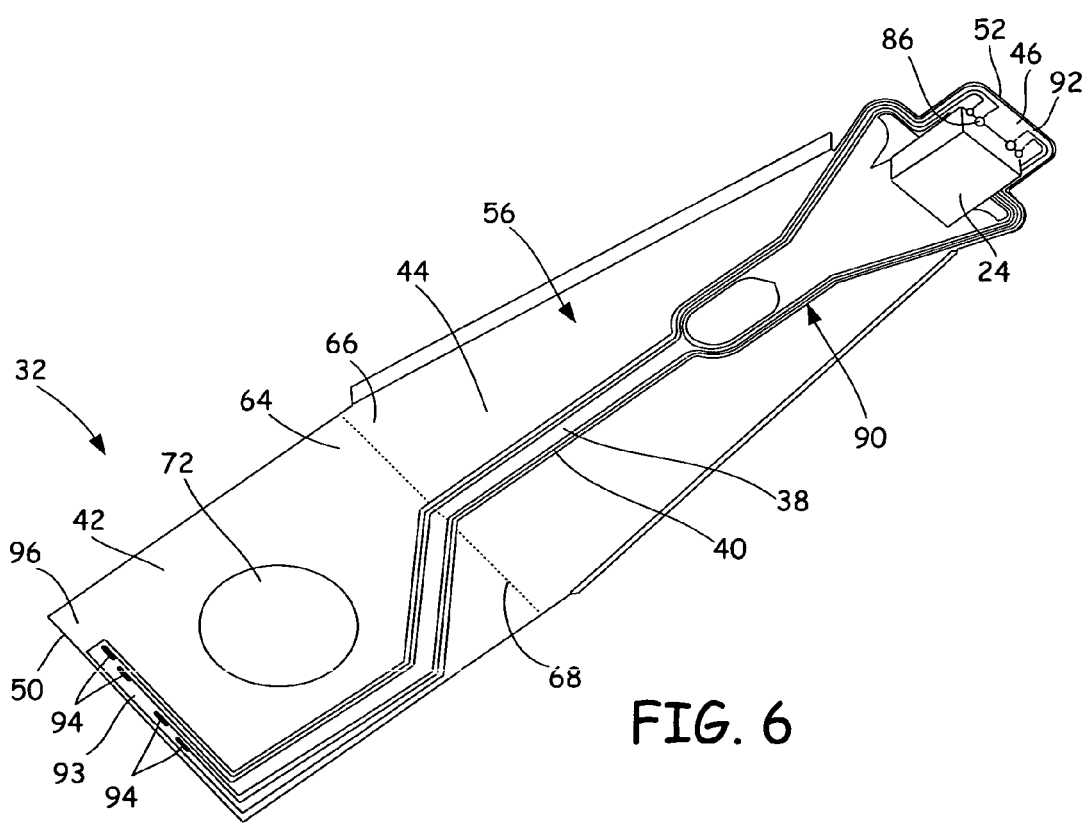
FIG. 6 is a bottom perspective view of the suspension assembly of the present invention with one embodiment of integrated interconnect pads.

FIG. 6 is a bottom perspective view of suspension assembly 32 illustrating another embodiment of an integrated interconnect path 90. Interconnect path 90 extends from flexure region 46, along load beam region 44, to attachment region 42 of suspension assembly 32. A first end 92 of interconnect path 90 is electrically interconnected with slider 24 via various methods, including gold ball bonds or solder 86. A second end 93 of interconnect path 90 terminates at attachment region 42 of suspension assembly 32, to form a connection point between suspension assembly 32 and actuator arm 14 (not shown). Interconnect pads 94 are positioned at a rearward portion 96 of attachment region 42, adjacent first end 50 of suspension assembly 32, to provide an electrical and mechanical connection between suspension assembly 32 and actuator arm 14. Interconnect path 90 is defined by insulator layer 38 and conductor layer 40 and interconnect pads 94 are defined by conductor layer 40. Solder and/or conductive adhesive electrically and mechanically connects interconnect pads 94 of suspension assembly 32 to actuator arm 14. In addition, a non-conductive adhesive at attachment region 42 may also be used to attach the two pieces and constrain attachment region 42 at attachment line 68.

Figure 7:
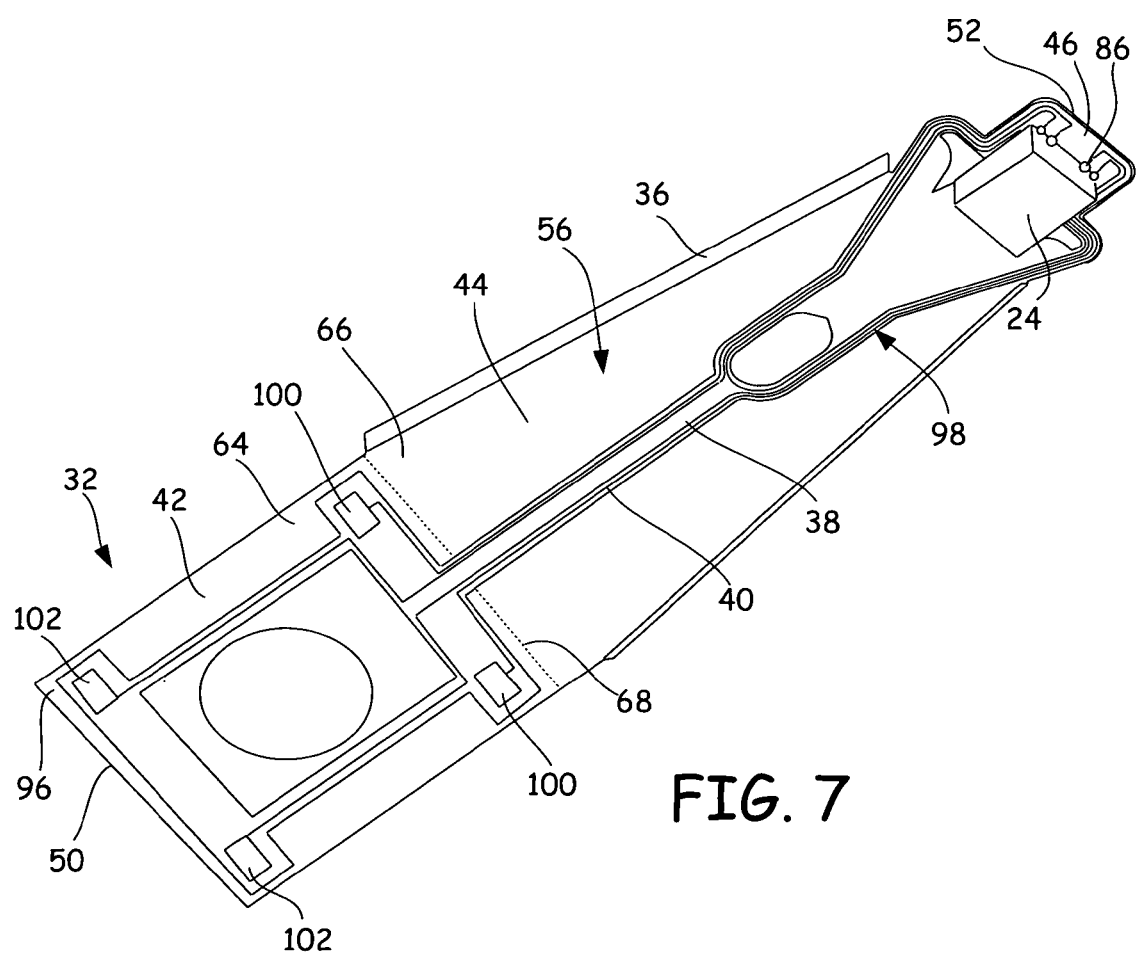
FIG. 7 is a bottom perspective view of the suspension assembly of the present invention with a further embodiment of integrated interconnect pads.

FIG. 7 is a bottom perspective view of suspension assembly 32 illustrating another embodiment of an integrated interconnect path 98. Interconnect path 98 extends from flexure region 46, along load beam region 44, to attachment region 42. Interconnect path 98 includes two sections of interconnect pads. A first section of interconnect pads 100 are located at forward portion 64 of attachment region 42 and proximate load beam region 44. A second section of interconnect pads 102 are located at attachment region 42 and adjacent first end 50 of suspension assembly 32. Interconnect path 98 connects the two sections of pads 100, 102 to maintain the electrical path. First section of pads 100 and second section of pads 102 provide an electrical and mechanical connection between suspension assembly 32 and actuator arm 14 (not shown). Solder and/or conductive adhesive connects interconnect pads 100 and 102 with actuator arm 14. In addition, a non-conductive adhesive at attachment region 42 may also be used to further bond the two pieces and constrain attachment region 42 at attachment line 68.

In each embodiment discussed above, each interconnect pad section includes four pads, however, in further embodiments of the present invention fewer or more interconnect pads are located at each section. Interconnect pads are located at attachment region 42 of suspension assembly 32 and are positioned at any location on bottom surface 56 of attachment region 42 to provide an electro-mechanical attachment between suspension assembly 32 and actuator arm 14. In addition to the interconnect pad locations discussed above, forward interconnect (FIG. 4B), rearward interconnect (FIG. 6), and four-corner interconnect (FIG. 7), other examples include interconnect pads located along edges 78 and 80 or centered at attachment region 42.

Figure 8:
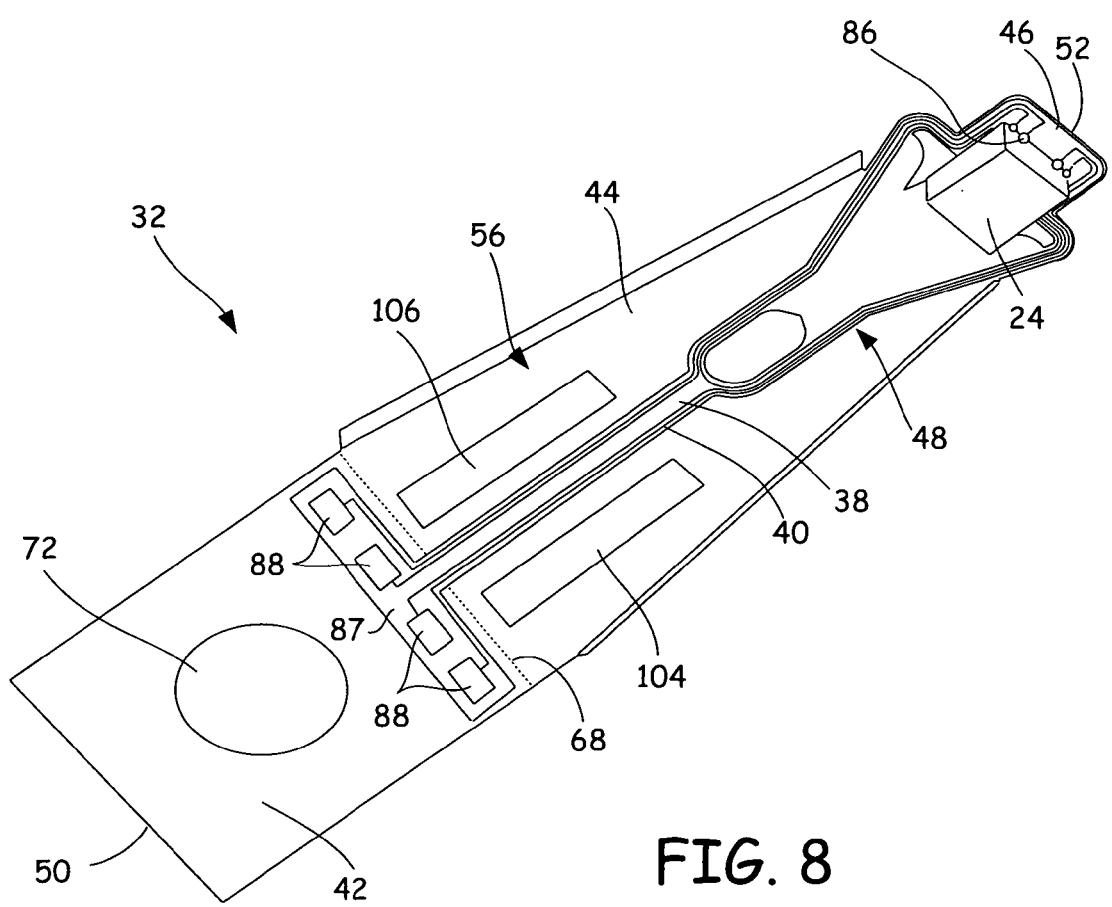
FIG. 8 is a bottom perspective view of the suspension assembly of the present invention with integrated stiffener plates.

FIG. 8 is a bottom perspective view of integrated suspension assembly 32, including integrated stiffener plates 104 and 106, or stiffener members, to add structural rigidity to suspension assembly 32. First and second stiffener plates 104, 106 are positioned at load beam region 44 of suspension assembly 32. Stiffener plates 104, 106 are defined by conductor layer 40 of laminate substrate 34 and do not electrically connect with interconnect path 48. In further embodiments of the present invention, fewer or more stiffener plates are fabricated as part of integrated suspension assembly 32 and may be located at any region 42, 44, 46 along bottom surface 56 of suspension assembly 32. Stiffener plates 104, 106 provide additional stiffness to suspension assembly 32, which increases the vibrational frequency mode and enhances performance of suspension assembly 32. In addition, an electrically isolated stiffener plate integrated at attachment region 42 provides an additional area for mechanical attachment between suspension assembly 32 and actuator arm 14.

The present invention is a simple, low cost suspension assembly including an interconnect path. The suspension assembly is a single component, with an integrated attachment plate, load beam, flexure, and interconnect path. The integrated suspension assembly is fabricated from a multi-layer laminate substrate having a support layer, an insulator layer and a conductor layer. Fabricating the entire integrated suspension assembly from the laminate substrate is a cost effective method for building the assembly that requires no additional assembly processes for completing the suspension assembly prior to attachment to an actuation assembly or mounting another component, such as a slider.

Although the present invention has been described with reference to preferred embodiments, workers skilled in the art will recognize that changes may be made in form and detail without departing from the spirit and scope of the invention.

The invention claimed is:

1. A suspension assembly comprising:
   a slider supporting a read/write head;
   a multi-layer laminate substrate having a base layer, an insulator layer and a conductor layer, the laminate substrate further comprising an attachment region for attaching to an actuator arm, a load beam region, a flexure region for supporting the slider, and an interconnect path extending along the flexure region, the load beam region and the attachment region, wherein the interconnect path terminates at the attachment region at a plurality of connection points that collectively provide an electro-mechanical connection between the multi-layer laminate substrate and the actuator arm; and
   a stiffener member defined by the conductor layer wherein the stiffener member is not electrically connected to the interconnect path, wherein the stiffener member is positioned along the load beam region.

2. The suspension assembly of claim 1 wherein the base layer defines a top surface of the suspension assembly and the conductor layer defines a bottom surface of the suspension assembly.

3. The suspension assembly of claim 2 wherein a rail defined by at least the base layer extends from the top surface of the suspension assembly.

4. The suspension assembly of claim 1 wherein a portion of the base layer has a thickness greater than a remainder of the base layer.

5. The suspension assembly of claim 1 wherein the interconnect path is defined by the insulator layer and the conductor layer, and further wherein the connection points are defined by the conductor layer.

6. The suspension assembly of claim 1 wherein the stiffener member is positioned along the attachment region.

7. The suspension assembly of claim 1, and further comprising solder connections between the connection points and the actuator arm.

8. The suspension assembly of claim 1, and further comprising a conductive adhesive for connecting the connection points and the actuator arm.

9. A suspension assembly comprising:
   a multi-layer laminate substrate, the laminate substrate having a first end and a second end, and the laminate substrate having an attachment region at the first end for both mechanically and electrically connecting the multi-layer laminate substrate to an actuation assembly, a support region at the second end for supporting an item, a flexible region between the attachment region and the support region, and an interconnect path extending along a bottom surface of the laminate substrate from the support region to the attachment region, wherein the interconnect path further comprises a plurality of interconnect pads located at the attachment region, wherein the suspension actuation assembly is both mechanically and electrically connected to the actuation assembly at a plurality of the interconnect pads, and wherein the interconnect pads are positioned proximate the flexible region.

10. The suspension assembly of claim 9 wherein the multi-layer laminate substrate comprises a base layer forming a top surface of the laminate substrate, a conductor layer forming the bottom surface of the laminate substrate and an insulator layer sandwiched between the base layer and the conductor layer.

11. The suspension assembly of claim 10 wherein the interconnect path is defined by the insulator layer and the conductor layer.

12. The suspension assembly of claim 10, and further comprising a stiffener plate defined by the conductor layer wherein the stiffener plate is not electrically connected to the interconnect path.

13. The suspension assembly of claim 10, and further comprising a rail defined by at least the base layer extending from the top surface.

14. The suspension assembly of claim 13 wherein the multi-layer laminate substrate includes first and second edges extending between the first end and the second end, the rail comprising a first rail formed by a portion of the first edge and the laminate substrate further comprising a second rail formed by a portion of the second edge.

15. The suspension assembly of claim 10 wherein a portion of the base layer has a thickness greater than a remainder of the base layer.

16. The suspension assembly of claim 9 wherein the interconnect pads are positioned adjacent the first end of the multi-layer laminate substrate.

17. An assembly for mechanically and electrically linking an actuator arm with a slider supporting a read/write head proximate a rotating disc, the assembly comprising:
   a multi-layer substrate having an attachment region for attachment to an actuator arm, a load beam region, a flexure region for supporting a slider and an interconnect path, the multi-layer substrate including a first end at the attachment region and a second end at the flexure region with the load beam region positioned therebetween;
   wherein the multi-layer substrate has a support layer defining a top surface of the substrate, an insulator layer and a conductor layer defining a bottom surface of the substrate, the interconnect path being defined by the insulator layer and the conductor layer;

wherein the interconnect path terminates at the attachment region at a connection point to provide an electro-mechanical attachment to the actuator arm; and whereih the electro-mechanical connection is the only connection between the multi-layer laminate substrate and the actuator arm.

18. The assembly of claim 17, and further comprising a stiffener plate defined by the conductor layer.

19. The assembly of claim 17 wherein the multi-layer substrate further comprises a rail formed by a portion of the support layer and extending from the top surface of the substrate.

20. The assembly of claim 17 wherein a portion of the support layer has a thickness greater than a remainder of the support layer.

21. The assembly of claim 17 wherein the interconnect path further comprises an interconnect pad at the attachment region for electro-mechanical attachment to the actuator arm.

22. The assembly of claim 17 wherein the substrate further comprises a void formed in the load beam region adjacent the attachment region.

23. A data storage device comprising:

a storage medium;

a slider;

a read/write head supported by the slider for reading and writing data to and from the storage medium;

an actuator arm assembly; and an integrated suspension assembly including an attachment region having multiple electro-mechanical connection points that collectively provide a mechanical attachment to the actuator arm assembly and electrical connections to the actuator arm assembly without additional mechanical or electrical connections therebetween, a load beam region, flexure region for supporting the slider, and an interconnect path extending along the flexure region, the load beam region and the attachment region to electrically connect the slider to the actuator arm assembly, the integrated suspension assembly further comprises a multi-layer laminate substrate having a support layer, an insulator layer and a conductor layer wherein the interconnect path is defined by the insulator layer and the conductor layer.

* * * * *

UNITED STATES PATENT AND TRADEMARK OFFICE
CERTIFICATE OF CORRECTION

| | | |
|---|---|---|
| PATENT NO. | : 7,099,118 B2 | Page 1 of 1 |
| APPLICATION NO. | : 10/725220 | |
| DATED | : August 29, 2006 | |
| INVENTOR(S) | : Andrew J. Hutchinson et al. | |

It is certified that error appears in the above-identified patent and that said Letters Patent is hereby corrected as shown below:

Column 4, Line 56, delete "maybe", insert --may be--

Signed and Sealed this

Twentieth Day of February, 2007

JON W. DUDAS
*Director of the United States Patent and Trademark Office*